(12) United States Patent
Christensen

(10) Patent No.: US 6,387,419 B1
(45) Date of Patent: May 14, 2002

(54) PIGLET FEEDING METHOD

(75) Inventor: Børge Holm Christensen, Ålsgårde (DK)

(73) Assignee: Biofiber-Damino A/S, Gesten (DK)

( * ) Notice: Subject to any disclaimer, the term of this patent is extended or adjusted under 35 U.S.C. 154(b) by 0 days.

(21) Appl. No.: 09/701,637

(22) PCT Filed: May 31, 1999

(86) PCT No.: PCT/DK99/00288

§ 371 Date: Jan. 22, 2001

§ 102(e) Date: Jan. 22, 2001

(87) PCT Pub. No.: WO99/62355

PCT Pub. Date: Dec. 9, 1999

(30) Foreign Application Priority Data

Jun. 2, 1998 (DK) .................................. 1998 00755

(51) Int. Cl.$^7$ ........................... A23K 1/175; A23K 1/14
(52) U.S. Cl. ................. 426/2; 426/53; 426/74; 426/623; 426/630; 426/635; 426/637; 426/650; 426/656; 426/658; 426/807
(58) Field of Search .................. 426/2, 656, 658, 426/623, 630, 635, 637, 650, 807, 74, 53

(56) References Cited

U.S. PATENT DOCUMENTS 3,478,073 A * 11/1969 Rydh ........................ 260/439
4,171,379 A * 10/1979 Harmon et al. ................. 426/2
5,085,874 A * 2/1992 Jungvid ........................ 426/41
5,356,625 A * 10/1994 Ying ........................ 424/94.1
5,662,922 A * 9/1997 Christensen ................ 424/438

FOREIGN PATENT DOCUMENTS

| DE | 2111638 | | 2/1971 |
| DE | 2111638 | * | 1/1983 |
| SU | 1412707 | * | 1/1987 |
| WO | 9313783 | * | 7/1993 |

OTHER PUBLICATIONS

Derwent Patent Abstract—XP–002111202 (Jul. 30, 1988).

* cited by examiner

Primary Examiner—Chhaya D. Sayala
(74) Attorney, Agent, or Firm—Hunton & Williams

(57) ABSTRACT

A method of obtaining optimum performance of piglets without the use of antibiotic growth promoters, comprising administering to the piglets at least during the entire suckling period two different feed supplement compositions comprising dietary fibers, iron and other micronutrients including copper and zinc, where the first composition has the highest content of iron. A third feed supplement composition comprising dietary fibers and electrolytes may be used to prevent or cure diarrhoea as a substitute for antibiotic treatment.

40 Claims, No Drawings

PIGLET FEEDING METHOD

FIELD OF INVENTION

The present invention pertains to the field of pig breeding. Specifically there is provided a method whereby optimum performance of piglets during the first period of their life can be achieved without the use of medicinal aids such as antibiotic growth promoters and iron-containing injectable preparations.

TECHNICAL BACKGROUND AND PRIOR ART

In present-day intensive pig breeding a very high production efficiency is required to obtain an economically feasible production. Thus, to illustrate the high level of efficiency that is generally aimed at, each sow should preferably produce about 25 live offsprings at weaning per annum and the weight of piglets is increased by a factor of five during the first four weeks after birth. To achieve such a high level of efficiency including the extremely high rate of weight gain it is a requirement that the piglets are constantly supplied with all essential macro- and micronutrients and that it can be avoided that they suffer from infectious diseases and other adverse health conditions including suboptimal gastrointestinal function.

One significant problem which is associated with highly intensive rearing of piglets is that the suckling animals will develop anaemic conditions, unless a supplementary source of iron is provided. At birth, piglets have a total body reservoir of iron which is about 50 mg. During the first 3 to 4 weeks of life (the suckling period) their weight gain is so rapid that the daily requirement for iron is about 7–10 mg in order to maintain a physiologically normal level of hemoglobin in their blood, i.e. about 90–120 g per l. However, the daily supply of iron from the sow's milk is only about 1 mg and inevitably, a serious and often fatal, anaemic condition will occur within a few days after birth, if a supplementary iron supply is not provided.

Other micronutrients (or trace elements) which are not supplied in physiologically required amounts in sow's milk include metal ions such as zinc and copper ions. A shortage of such micronutrients will give rise to a reduced weight gain efficiency and increased susceptibility to infectious diseases.

Another prerequisite for a high rate of weight gain and good health conditions in piglets is that the capacity of their gastrointestinal tract to digest and absorb nutrients is at an optimum level, in particular around the time of weaning. In intensive pig breeding it is aimed at weaning the piglets as early as possible in order to obtain as many piglets per sow as possible. Thus, it is not uncommon to wean piglets at an age of 3 to 4 weeks where the diet of the piglets is changed suddenly or gradually from the natural nutrient source, sow's milk, to solid pre-starter or starter feed formulations.

One further significant condition for an effective gastrointestinal function, especially under weaning conditions, is that the surface area of the intestinal mucosa wherefrom digested nutrients are absorbed into the blood stream is as large as possible and that there are optimum physico-chemical conditions, including the pH, for nutrient absorption at the mucosal surfaces. An important factor that determines the intestinal mucosal surface area is the length and number of intestinal villi.

In intensive farm animal production, diarrhoea or scouring in young animals is another serious problem which presently is predominantly prevented or treated by the use of antibiotics. However, a widespread use of antibiotics in animals is associated with a highly undesirable selection of antibiotic resistant bacteria which may be transferred to humans or healthy animals. Therefore, alternative means of prevention of scouring is needed.

Currently used measures that can be taken to secure an appropriate performance of piglets during the suckling period and at and after weaning include (i) administering to the piglets a supplementary supply of iron and other physiologically required micronutrients such as copper and zinc, (ii) administering antibiotic growth promoting and disease controlling substances and (iii) supplementing during suckling the sow's milk diet with a pre-starter feed formulation generally having a composition which is close to that of the sow's milk.

Presently, a supplementary supply of iron is normally provided by giving newborn piglets an injection of an iron-containing substance such as an iron dextran. Evidently, this method of supplying iron is very labour-consuming and in addition, it involves a risk of spreading infectious microorganisms via the injection needle and of causing a stress condition in the animals. An alternative method of supplying iron to suckling piglets is disclosed in WO 93/13783. This method implies the administration during the first two weeks after birth of an oral composition that comprises bioavailable iron and which may be ingested voluntarily by the suckling piglets in sufficient amounts to maintain a physiologically appropriate blood composition of the animal.

However, the above iron-containing composition must be administered in relatively high amounts to secure an adequate iron supply which from a cost point of view implies that this way of supplying iron is not competitive with the conventionally used iron injection. This is a significant problem as the profit margin in pig breeding is generally relatively small.

The current practice of using antibiotic growth promoters is increasingly being objected to by consumers and health authorities due to the risk of selection of antibiotic resistant bacteria and therefore the use of such substances is restricted or even banned in several countries.

Accordingly, there is a need for alternative growth promoting substances which do not only enhance the growth of piglets but which also prevent diarrhoea caused by infectious agents. Substances which have been studied as potential substitutes for antibiotic growth promoters include viable microbial cultures such as lactic acid bacteria and yeast; organic acids including e.g. formic acid and citric acid and salt of organic acids; enzymes such as proteases, cellulases, glucanases or xylanases; oligosaccharides including fructooligosaccharides, xylooligosaccharides, lactulose or lactitol and various plant preparations e.g. of garlic. All of such compounds have been administered to piglets by incorporating them into pre-starter or starter feed formulations. However, during the suckling period and the early post-weaning period, the consumption of dry feed materials by piglets is so limited that the above compounds cannot be administered in effective amounts via feed compositions and hence these attempts to substitute antibiotic growth promoters have generally been unsuccessful.

In addition to the above compounds, several dietary fibre products such as citrus pectin, guar gum and similar polysaccharides have been tested for possible growth promoting effects but in animal experiments no effect on weight gain has been observed.

It has been reported that copper or zinc ions, when administered to piglets at about 10 times the physiological requirement may have a growth promoting effect at a level comparable to that obtainable by antibiotic growth promoters. However, a widespread use of these metal ions is a matter of considerable environmental concern, as they will accumulate in cultivated soil via the use of manure as fertilizer. Therefore, the use of copper and zinc as growth promoters has been restricted or banned in many countries.

It has now been found that it is possible to design a method of supplementing the diet of suckling and newly weaned piglets with functional feed supplement substances such that all of the above problems associated with current pig breeding and feeding practices can be effectively reduced or avoided. Thus, the method of the present invention provides: (i) a physiologically adequate oral iron supply at a cost level that is competitive with iron supply by injection, (ii) a growth promotion effect at a level which is similar to that of the currently used antibiotic substances without any health risks or adverse environmental effects and (iii) prevention or cure of diarrhoeal conditions caused by microorganisms or dietetic disorders. As the method implies that the functional feed supplement substances are supplied as dry compositions, its use is also highly convenient even in large breeding facilities.

SUMMARY OF THE INVENTION

Accordingly, the present invention provides a method of supplying non-antibiotic growth promoting substances to a piglet, the method comprising (i) administering, during the first part of the suckling period, to the piglet a first dry functional feed supplement composition comprising fermentable dietary fibres and a micronutrient component comprising at least 0.6% by weight of elemental iron and, subsequent to said first part of the suckling period, (ii) administering to the piglet during at least part of the remaining part of the suckling period a second dry functional feed supplement composition comprising fermentable dietary fibres and a micronutrient component comprising at least 0.2% by weight of elemental iron, wherein the proportion of elemental iron in said second functional feed supplement is at the most 90% of that of the first functional feed supplement, the method supplying to the piglet at least the physiologically required amount of iron and other micronutrients during the suckling period.

DETAILED DISCLOSURE OF THE INVENTION

The major objective of the invention is to provide a method of supplying non-antibiotic growth promoting substances including iron to suckling and weaned piglets so as to achieve an optimum performance of the young animals without inconvenient management practices being involved and without the use of environmentally or otherwise objectionable feed supplements. The method supplies to the piglet at least a physiologically required amount of iron and other micronutrients during the entire suckling period.

As used herein, the expression "growth promoting substance" (or growth promoter) includes any substance which, when administered in effective amounts to suckling or weaned piglets, results in a performance of the animals that is improved relative to that of piglets of the same age and kept and fed under identical conditions but to which no growth promoting substance is not administered (controls).

Such an improved performance includes higher daily weight gain and/or higher feed conversion rate (kg body weight gain per kg of feed). In this context, an interesting increase of weight gain or of the feed conversion rate over control animals is one of at least 2% such as at least 5%, e.g. at least 10%.

An improved performance can also be reflected in reduced rates of disease conditions such as diarrhoea or anaemia or weakliness, caused by dietary deficiencies with respect to essential micronutrients. It will be appreciated that piglets suffering from such conditions generally will have a lower weight gain and/or feed conversion capacity as compared to piglets not suffering from such conditions.

Accordingly, the growth promoting effect of the method according to the invention can be obtained not only in piglets, the diet of which is insufficient in respect of one or more essential nutrient component, but also in piglets on a diet which is sufficient with respect to the physiological requirement for macro- and micronutrients.

In accordance with the method of the invention, two different dry functional feed supplement compositions both comprising fermentable dietary fibres and a micronutrient component comprising iron are administered to the piglets during different periods of time during suckling and optionally after weaning.

In the present context, the expression "functional feed supplement" refers to a substance or compound or a mixture hereof that is administered to the piglets in addition to the their main diet which provides the macronutrients, protein, lipids and carbohydrates and which substance or compound has a more or less defined function in the piglet as it will be described in the following. In accordance with the invention, functional feed supplement substances include: (i) inorganic micronutrients such as iron, copper and zinc compounds; (ii) different types of dietary fibre components and (iii) organic compounds including organic acids, metal salts of organic acids, but other non-micronutrient functional compounds and substances may also be used in the compositions of the invention such as e.g. enzymes, microbial cultures, vitamins, flavouring agents, therapeutically active substances, amino acids or peptides.

The capacity of suckling piglets to ingest non-milk dry materials is rather limited. Thus, a suckling piglet having a daily consumption of 100 to 200 g of milk dry matter will normally only ingest 2–3 g of non-milk dry matter per day during the first 10 days of life. This amount increases gradually during the following about 10 days of the suckling period up to an average of about 10–15 g per day. This limited capacity for uptake by the piglet of dry materials implies that it is generally difficult to supply functional feed supplement compounds to suckling piglets at effective amounts, especially during the first 10–12 days of the suckling period.

Thus, as an example, the iron-containing composition disclosed in WO 93/13783 and which typically contains about 5–10 wt % of iron, calculated as elemental iron and which is administered during the first two weeks of life must be administered at a total amount of about 33 g per piglet during that period to supply, including a good safety margin, the physiologically required amount of iron to the piglet during that period. As it is mentioned above, the cost of such an amount of that commercial product is less cost competitive when compared to the cost of an iron injection treatment after birth.

It has now been discovered that a physiologically sufficient amount of iron can be supplied to suckling piglets at a significantly lower cost when the iron is administered in combination with dietary fibres during the entire suckling period and optionally for some days after weaning. It has also been found that such an extended period of iron supply results in a higher hemoglobin content of the blood of piglets at weaning as compared to that of piglets to which an iron-containing composition is administered only during the first part of the suckling period.

In accordance with the invention, the first iron and dietary fibre-containing feed supplement composition which may e.g. be a composition as disclosed in WO 93/13783 is typically administered during the suckling period from birth to about 10–12 days after birth or for a shorter or longer part of the suckling period at a total amount of 15–25 g per piglet. However, if needed, the first feed supplement composition may be administered in a total amount during the suckling period which is the range of 25 to 40 g such as in the range of 30 to 35 g per piglet.

As it is mentioned above, it is common in current pig breeding practice to supply a pre-starter feed composition having a milk-like composition to suckling piglets to supplement the sow's milk diet. Such a pre-starter can e.g. be supplied as from day 5–7. Optionally, a pre-starter composition is replaced by a starter feed composition some days prior to weaning. However, as the capacity of the suckling piglet to ingest dry materials is limited, it is an aspect of the present invention that the first feed supplement composition can supply the required growth promoting substances without concomitant feeding with a pre-starter or starter feed composition. Accordingly, in one embodiment, the first functional feed supplement is administered as the only feed supplement. However, it is not excluded that the first functional feed supplement is mixed into a pre-starter or starter feed composition.

The above first feed supplement composition has an iron content of at least 0.6 wt %, calculated as elemental iron. Typically, the amount of iron is in the range of 0.6 to 25 wt %, e.g. in the range of 0.6 to 10 wt %, such as in the range of 1 to 8 wt % including in the range of 2 to 5 wt %.

The source of iron may be any ferrous or ferric iron compound which, when administered in accordance with the invention, results in the maintenance of a physiologically normal hemoglobin content of the piglets. Thus, a suitable iron compound may be selected from an organic iron salt, an inorganic iron salt and a compound in which the iron is chelated or present in a complex-bound form. Although ferrous compounds may be preferred due to a higher bioavailability relative to ferric compounds, the latter group of compounds are also suitable. Suitable inorganic compounds include as examples iron salts of hydrochloric and sulphuric acid.

In accordance with the invention, any organic iron compound which has the above effect can be selected. In preferred embodiments, the composition comprises an organic iron compound which e.g. can be selected from a formate, an acetate, a propionate, a fumarate, a lactate, a citrate, a succinate, a fatty acid salt of iron, an amino acid salt of iron including glutamate or there may be used a mixture of two or more of these salts. Other useful iron-containing substances include substances wherein the iron is complex-bound to a carbohydrate moiety such as a dextran, and heme which is the iron-containing prostestic group found in hemoglobin and myoglobin and which can be obtained from these proteins by removing the globin moiety. As it has been mentioned, ferrous compounds are generally more preferred than ferric compounds, since ferrous compounds are more readily absorbed from the intestines.

Commercially available qualities of organic iron compounds may be in the form of relatively coarse particles. However, iron salts such as e.g. ferrous fumarate which at the pH conditions prevailing in the gastrointestinal tract of suckling piglets are sparingly soluble may have an unacceptably low bioavailability when provided as large particles, i.e. particles of a size exceeding 50 µm. Accordingly, in preferred embodiments the feed supplement composition contains an organic iron salt which is in the form of particles of an average size which is at the most 50 µm, such as at the most 30 µm and preferably at the most 10 µm.

In the present context, one particularly useful and economically feasible iron salt is ferrous fumarate. Commercially available grades of this salt, however, may be in the form of particles, the average size of which is considerably larger than 50 µm. Therefore, when ferrous fumarate is selected as the organic iron salt, an initial step of preparing this salt in a finely grained form is advantageously included in the preparation of the composition. This is conveniently carried out based on the process disclosed in U.S. Pat. No. 3,478,073 according to which an aqueous mixture of fumaric acid and ferrous hydroxide is reacted under conditions where the precipitation of ferrous fumarate results in the formation of fine particles of the above defined size.

Another suitable and economically feasible organic iron source is ferrous formate which, in contrast to ferrous fumarate, is readily soluble.

In certain preferred embodiments, the iron is supplied in the form of salts of amino acids such as e.g. glutamates, or as iron bound to peptides. A mixed amino acid iron salt may thus be prepared by mixing a water soluble iron salt with a hydrolysate of protein whereby amino acid salts and salts of peptides are formed.

The first feed supplement composition has, as it is mentioned above, a content of iron which is in the range of 0.6 to 25 wt %, calculated as elemental iron. The required amount of the iron-containing compound depends i.a. on the iron content of the compound, the solubility of the compound under the conditions prevailing in the gastrointestinal tract and the particle size in which the compound is provided.

From a cost point of view it is advantageous to select an iron compound with a high content of iron. As one example, ferrous chloride has an iron content of about 65 wt %. Among organic iron salts, a particularly high content of iron is found in ferrous formate (38 wt %), but also ferrous acetate, fumarate, succinate and malate have a high iron content (32–33 wt %). Ferrous glutamate has an iron content of about 28 wt % and a mixture of amino acid salts prepared as mentioned above may typically have an iron content of about 20 wt %.

The iron-containing compound is preferably one which, when present in the gastrointestinal tract has a high degree of bioavailability. Accordingly, when the iron source is an organic iron compound, a bioavailability which is at least 5% is preferred, although one having a bioavailability of at least 10% is more preferred. In particularly preferred embodiments, the organic iron salt has a bioavailability of at least 20%, such as at least 25%. When the iron source is an inorganic iron compound the bioavailability is preferably at least 25%, more preferably at least 50% and most preferably at least 90%.

The first functional feed supplement composition of the invention comprises selected functional dietary fibres in an amount which is typically in the range of 1 to 50 wt % such as in the range of 5 to 30 wt %. In the present context, the term "dietary fibres" is used generally to designate carbohydrate compounds which are not degradable by animal or human digestive enzymes. It will be appreciated that the term will also include carbohydrate compounds which at a given life stage of the piglets are not degradable in their gastrointestinal tract due to lack of enzymes capable of using such compounds as substrate. The term also includes certain low molecular compounds such as lactitol and lactulose which occur naturally in sow's milk.

The dietary fibre compounds of the first functional feed supplement composition of the invention include three different types of dietary fibres each having particular functional and physico-chemical characteristics. These types can be characterised as follows:

(i) Water soluble, microbially fermentable dietary fibres yielding low viscosity aqueous solutions, (ii) Water soluble, microbially fermentable dietary fibres yielding high viscosity aqueous solutions, and (iii) Water-insoluble, non-fermentable dietary fibres.

In the intestinal tract the fermentable types of dietary fibres are fermented by the indigenous intestinal microbial flora with the production of lactic acid and short chain fatty acids such as acetic acid, propionic acid and butyric acid.

The intestinal fermentation of dietary fibres implies several beneficial effects on the performance of the piglets. Thus, the formation of acids will stimulate the development of the intestinal system such that the surface area of the intestinal mucosa is increased. Additionally, the higher activity of acid producing bacteria will have an inhibitory effect on pathogenic bacteria with the effect that the frequency of diarrhoea is reduced which in turn implies that intestinal villi are developed to their full length. As mentioned above, a large number of fully developed intestinal villi implies an optimum capacity for intestinal absorption of nutrients. Without being bound by any hypothesis, it is assumed that it is to a large extent by this effect that fermentable dietary fibres exert a growth promoting effect.

Thus, it has been found in pig herds with a high production efficiency in terms of surviving piglets, weight gain and feed conversion rate that the use of antibiotic growth promoters could be substituted fully by the method of the invention without any decrease in production efficiency.

It is contemplated that a further significant effect of the fermentable dietary fibres is an enhanced bioavailability of the iron component, primarily as a result of the decrease of pH in the intestinal mucus layer. The more acidic environment increases the solubility of the iron-containing compound which in turn implies an increased absorption of iron. A further beneficial effect of the higher solubility of the iron compound is a stimulating effect on the acid-producing intestinal bacteria. These effects implies that there is a functional synergy between fermentable dietary fibres and the iron compound.

The above effects of administering fermentable dietary fibres to piglets are especially important at the time of weaning and the following days and it has been found that by administering large amounts of fermentable dietary fibres after weaning, fully developed intestinal villi can be retained substantially intact and the growth promoting effect caused by these dietary fibres be maintained for a substantial period of time after administration of the functional feed supplement compositions according to the invention has been terminated.

In accordance with the method of the invention, the proportion of the dietary fibres of the first functional feed supplement composition which is fermentable dietary fibres is preferably at least 20 wt % such as at least 30 wt % including at least 40 wt %. An even higher proportion of the functional fermentable dietary fibres may be appropriate under certain production conditions, e.g at least 50 wt % including at least 60 wt % such as at least 75 wt %.

The use of such beneficial dietary fibre-containing compositions in suckling piglets may be restricted by the fact that these animals are not willing to ingest the compositions in the amounts which are required to obtain the above effects. It is contemplated that a major reason for this rejection is the readiness with which dietary fibres swell in the oral cavity due to their high water absorption capacity. This problem may conveniently be circumvented by providing the dietary fibre-containing component in the form of particles comprising a continuous coating layer e.g. as it described in WO 93/13783.

Suitable dietary fibre-containing substance sources include citrus pulp, beet pulp, potato pulp, fruit peel and apple pomace. These sources may have been subjected to various treatments to increase the content of water soluble dietary fibre. Such treatments include as examples treatments with an acid or an alkaline substance. Other useful dietary fibre-containing ingredients may be selected from leguminous seed fibres including pea fibre and soy bean fibre, plant root or tuber fibre products such as potato fibre, chicory fibre, Jerusalem artichoke fibre and cereal fibre products including as examples, oat and wheat brans.

Furthermore, readily water soluble dietary fibre substances such as carrageenans, vegetable and microbially derived gums including Psyllium seed mucilages, guar gum,. gum arabicum, xanthan gum, locust bean gum, and alginates may be used in accordance with the present invention. Accordingly, in one suitable embodiment of the invention the dietary fiber component of the feed supplement composition comprises about 20 wt %. dried potato pulp, about 30 wt % dried apple pomace, about 5 wt % dried citrus pulp, about 24 wt % dried chicory pulp about 10 wt % guar gum, about 10 wt % Psyllium hulls and about 1 wt % betaine hydrochloride.

The content of the essential micronutrients, copper and zinc in sow's milk is not sufficient to cover the physiological needs in fast growing piglets. It is therefore required to supplement the diet of the suckling piglet with such micronutrients if a reduction in performance is to be avoided. This is achieved in the method of the invention by incorporating into the first feed supplement composition an amount of bioavailable compounds of copper and zinc that is required to cover at least the physiological needs for these micronutrients. The person skilled in the art will have no difficulties in estimating the physiologically required amounts of such micronutrients. It may, however, be advantageous to incorporate an amount of zinc and/or copper compounds which exceeds the basic physiological requirements. Thus, it is contemplated that a suitable amount of these micronutrients is at least 2 times higher than the basic physiological requirements such as at least 3 times higher including at least 4 times higher e.g. at least 5 times higher.

Any compounds such as zinc oxides and water soluble copper salts which under intestinal conditions are bioavailable can be used.

However, it has been found that copper and zinc ions which are linked to cation binding dietary fibres are particularly effective in the method of the invention. This implies that a given growth promoting effect of zinc or copper can be obtained at significantly lower amounts as compared to effective amounts of zinc and copper compounds not bound to dietary fibres. It is contemplated that this higher efficacy of dietary fibre bound zinc and copper ions is due to the fact that the dietary fibres to which they are bound take up water in the intestines and form a gel structure that associates with the mucosa of the intestinal epithelium. In this manner, the ions are immobilized in close association with the mucosal surface where they exert their biological effect.

The above enhancement of the effect of micronutrients which has been found for copper and zinc is also obtainable with ferrous or ferric ions. Accordingly, in another embodiment, the iron compound is provided in the feed supplement composition as dietary fibre bound ferrous or ferric ions.

In addition to iron, copper and zinc, the above feed supplement composition may comprise further micronutrients such as e.g. manganese and cobalt.

The method of the invention comprises, as it is mentioned above, a subsequent step of administering to the piglet during at least part of the remaining part of the suckling period a second dry functional feed supplement composition comprising fermentable dietary fibres and a micronutrient component comprising at least 0.2% by weight of elemental iron. Thus, the content of elemental iron in this composition is typically in the range of 0.2 to 25 wt %, e.g. in the range of 0.2 to 10 wt %, such as in the range of 1 to 8 wt % including in the range of 2 to 5 wt %.

The types and forms of functional compounds of this second feed supplement composition are essentially the same as those of the above first feed supplement composition. The total amount of dietary fibres in the second composition is generally within the ranges indicated above for the first composition. However, the proportion of the dietary fibres which is fermentable, in particular such dietary fibres which yield low viscosity aqueous solutions, may be higher relative to that of the above first composition.

In accordance with the invention, the proportion of elemental iron in the second functional feed supplement is at the most 90% of that of the first functional feed supplement. Thus, in preferred embodiments, the iron content, calculated as elemental iron, of the first composition, relative to that of the second composition is at least 25% higher such as at least 50% higher including at least 100% higher, e.g. at least 2 times higher such as at least 3 or 4 times higher.

The second functional feed supplement composition is administered as from the day 5 where the administration of the above first composition is terminated, typically from about day 10–12 and at least until weaning. It may be advantageous to continue administering the second composition for several days after weaning, such as for at least 2 days after weaning or even longer, e.g. for at least 3 days including at least 5 days after weaning.

The daily dosage of the second composition is typically in the range of 5 to 15 g per piglet. However, if needed, the dosage can be higher, especially around and after weaning. Thus, under particular production conditions, it is advisable that the second functional feed supplement composition is administered in a total amount which is in the range of 100 to 300 g per piglet from weaning to about 2 days after weaning, including a daily dosage during that period which is in the range of 30 to 90 g such as in the range of 40 to 80 g per piglet.

To achieve the desired effects as described above, it is important that no other dry materials are administered during the period where the capacity of the piglets to consume dry materials does not exceed the required amounts of the second feed supplement composition. However, after weaning, when the piglets are capable of consuming a higher amount of dry materials than that of the second feed supplement composition which is needed to secure the desired performance, it is appropriate that the piglets in addition to the second functional feed supplement be offered a conventional piglet feed composition.

As it is important that the piglets consume the administered dosage of the feed supplement compositions of the invention, the composition must be palatable to the piglets. It has been found that the appetite of the piglets for the compositions can be improved by incorporating a proteinaceous component into the composition. The source of such a component can be milk, fish, poultry, mammals, plants or microorganisms. As the digestive system of piglets is particularly adapted to digest milk proteins, it is preferred that non-milk protein components are at least partially hydrolyzed such as a degree of hydrolosis of at least 10%. In this context, particularly useful protein sources include iron-containing proteins such as hemoglobin or myoglobin.

An appropriate amount of protein in either of the first and second feed supplement compositions is an amount of protein (calculated as crude protein, i.e. N×6.25) in the range of 1 to 50 wt % such as in the range of 5 to 30 wt %.

Each of the two above compositions may further comprise a lipid component, e.g. in an amount in the range of 1 to 50 wt % such as a range of 5 to 30 wt %. Suitable lipids include fatty acid-containing substances which have a high degree of digestibility including as examples rendered lard, milk, vegetable oils and tallow. Mixtures of fatty acid substances with melting point above ambient temperature with substances having melting point below this temperature may be useful. Such low melting point substances include vegetable and marine animal oils such as fish oil having a high content of n–3 unsaturated fatty acids. In one preferred embodiment, the composition is an emulsified mixture of an amino acid-containing ingredient such as hydrolysed protein and the fatty acid-containing substance into which the iron compound and optionally one or more of the further ingredients as mentioned below can be mixed. In order to enhance the emulsification, a suitable surface-active emulsifying agent may be added. Suitable emulsifying agents may be selected from commercial food grade emulsifying agents such as fatty acid esters or lecithin.

As a means of improving the palatability of the above compositions, a flavouring agent can be added. In order to achieve a constant uptake during the entire period of administering the compositions, it is generally advantageous to incorporate the same flavouring agent in both compositions. In the present context, suitable flavouring agents include hydrolysed fish products and ethereal oils.

The feed supplement composition may comprise further components such as an organic acid or a salt thereof. Suitable organic acids include as examples lactic acid, formic acid, propionic acid and fumaric acid. Other useful components include vitamins, electrolytes, carbohydrates, bacterial cultures, enzymes, alkaline substances or acids. It may thus be particularly interesting to include one or more beneficial bacterial or yeast cultures having a growth promoting effect and/or a disease-preventing effect. Such cultures are also referred to as probiotics. In this context, useful bacteria include Bacillus spp. which produce exoenzymes capable of degrading nutrient components such as proteins, polysaccharides or fat. Other useful bacteria may be lactic acid-producing organisms such as Lactobacillus spp., Lactococcus spp., Bifidobacterium spp. or Streptococcus spp. In this context, useful enzymes include proteases, amylases, cellulases or lipases.

The above compositions according to the invention are typically provided in the form of a free-flowing powder having an average particle size which is at the most 1000 $\mu$m, e.g. in the range of 10 to 500 $\mu$m, preferably in the range of 50 to 250 $\mu$m such as e.g. in the range of 100 to 200 $\mu$m. In certain advantageous embodiments, the compositions are such wherein a plurality of primary particles are agglomerated, as agglomerated particles give rise to less dusting and separation of particles and become less sticky. The agglomeration can be carried out by conventional methods implying that primary powder particles in high motion are brought into contact with droplets of agglomeration liquid. The agglomeration liquid can be prepared from water soluble carbohydrates, water soluble fermentable dietary fibres, a protein hydrolysate and/or an emulsion of protein hydrolysate and lipid. The agglomeration step can also be carried out by means of a conventional compacting process, optionally followed by a granulation step.

In one specific embodiment, the method according to the invention comprises the further step of administering to the piglets after weaning a third non-antibiotic functional feed supplement composition comprising dietary fibres and electrolytes. The primary objective of administering this third composition is to prevent or cure diarrhoeal conditions occurring at or after weaning. It has been found that piglets to which the above first and second feed supplement compositions have been administered in general are less prone to contract diarrhoea than control animals which have not been treated according to the present method. Additionally, it has been observed that after such treatment, diarrhoea can be prevented to a significant extent by supplementing the post-weaning diet with an effective amount of the third feed supplement composition and, should diarrhoea occur, this condition can generally be cured without antibiotic treatment.

In accordance with the invention, the third feed supplement composition is typically administered for 3 to 4 days when it is considered that there is a risk that the piglets may develop diarrhoea or during outbreaks of diarrhoea.

The content of dietary fibres in the above third composition of the method is typically in the range of 10 to 90 wt % such as in the range of 15 to 75 wt %, including at 30 wt %. The dietary fibres are selected from the same types as those mentioned above. However, the proportion of water soluble dietary fibres yielding high viscous aqueous solutions and water-insoluble, non-fermentable dietary fibres are generally higher in the third feed supplement composition as compared to the first and second composition of the method. Thus, the total proportion of these two types in the total content of dietary fibres is typically at least 50 wt % including at least 60 wt % such as at least 75 wt %.

The electrolyte component of the above composition comprises water soluble alkaline metal salts such as sodium and/or potassium salts. Other useful compounds include sugars and amino acids such as glycine.

It has been found that the incorporation of an astringent agent into the third composition of the invention enhances the prophylactic or curing effect on diarrhoea. Particularly useful astringent agents include tannin compounds. In specific embodiments, the astringent agent is encapsulated, e.g. by a protein compound such as casein, or a natural or synthetic polymeric compound. By encapsulating the astringent agent in this manner it is achieved that the agent is not released in the anterior sections of the gastrointestinal tract where may have an adverse effect, e.g. on the activity of digestive enzymes.

In addition to the above functional compounds, the third feed supplement composition may comprise further components including any of the compounds mentioned above which are used in the first and/or second feed supplement composition including a flavouring agent as defined above. When a flavouring agent is incorporated, it is preferably the same agent as that used in the two other feed supplement compositions.

The above dietary fibre and electrolyte-containing composition is typically provided as a dry powder as it is described above for the two other compositions, optionally as agglomerated particles as also described above.

Any of the three feed supplement compositions according to the invention is, as mentioned above, typically provided as dry powder compositions. In suitable embodiments, the water content of such dry compositions is at the most 10% by weight.

The invention is further illustrated by the following, non-limiting example.

EXAMPLE

Three experiments were conducted applying a first feed supplement composition according to the invention with a content of 6 wt % of elemental iron, and 3 different second feed supplement compositions according to the invention having an elemental iron content of 0.4 wt %, 1.0 wt % and 1.5 wt %, respectively. The first and the second feed supplement composition both had a dietary fibres content of approximately 15%.

The experiments were carried out using 14 litters as experimental group and 14 litters as control group.

The first feed supplement composition was administered to the experimental group from day 1–12 in a total amount of 25 g per piglet, and the second feed supplement was administered from day 12 until 2 days after weaning (day 28) in a total amount of 200 g per piglet.

The piglets in the corresponding control group each received 200 mg Fe by injection (Hyo-Fer) and a commercially available pre-starter ad lib from day 12 to weaning (day 26). The pre-starter contained an antibiotic growth promotor as well as 200 mg elemental iron ($FeSO_4$) per kg.

The hemoglobin content in the blood of the piglets was analysed at day 14 and day 24.

The results of these hemoglobin analyses from the three experiments are summarised in the below Tables 1, 2 and 3:

TABLE 1

Experiment 1, 0.4 wt % elemental iron

| | Hemoglobin g/dl (standard deviation) | |
|---|---|---|
| Day | Control group | Experimental group |
| 14 | 10.42 (±1.03) | 10.83 (±1.10) |
| 24 | 11.29 (±0.95) | 10.03 (±1.06) |

TABLE 2

Experiment 2, 1.0 wt % elemental iron

| | Hemoglobin g/dl (standard deviation) | |
|---|---|---|
| Day | Control group | Experimental group |
| 14 | 10.65 (±1.09) | 10.60 (±1.18) |
| 24 | 11.70 (±1.38) | 11.46 (±1.77) |

TABLE 3

Experiment 3, 1.5 wt % elemental iron

| Day | Hemoglobin g/dl (standard deviation) | |
|---|---|---|
| | Control group | Experimental group |
| 14 | 10.45 (±0.78) | 11.02 (±0.99) |
| 24 | 11.17 (±1.25) | 12.05 (±1.55) |

As is clearly seen from the above Tables, the results obtained by the method according to the invention (experimental group) are not significantly different from the results obtained by the conventional method (control group) by which iron is administered by injection. Thus, the hemoglobin content in the blood of both the control group and experimental group is within the normal physiological level of about 90–120 per l. Hence, the method according to the invention is just as effective as the conventional method in respect of providing a sufficient amount of iron to piglets.

The control groups and the experimental groups from the three experiments were monitored for weight gain from birth until weaning and for mortality. These results are shown in the below Table 4.

TABLE 4

Average weight gain and mortality for experiments 1, 2 and 3

| | Control group | Experimental group |
|---|---|---|
| Average weight per piglet at birth | 2.36 kg | 2.37 kg |
| Average weight per piglet at weaning | 7.17 kg | 7.38 kg |
| Average weight gain | 4.81 kg | 5.01 kg |
| Mortality until weaning | 5.0% | 5.0% |
| Mortality 0–7 weeks after weaning | 2.7% | 1.2% |

It can clearly be seen from the above Table 4 that the average weight gain was significantly higher when applying the method according to the invention (experimental group) as compared to the control group. It is also seen that the mortality from weaning until 7 weeks after was 2.7% in the control group whereas the experimental group only had a mortality rate of 1.2%. Thus, the method according to the invention reduces the mortality rate as compared to the conventional method. The mortality rate from birth until weaning was not different in the two groups.

What is claimed is:

1. A method of supplying non-antibiotic growth promoting substances to a piglet, the method comprising
   (i) administering, during the first part of the suckling period, to the piglet a first dry functional feed supplement composition comprising fermentable dietary fibres and a micronutrient component comprising at least 0.6% by weight of iron calculated as elemental iron, and, subsequent to said first part of the suckling period,
   (ii) administering to the piglet during at least part of the remaining part of the suckling period a second dry functional feed supplement composition comprising fermentable dietary fibres and a micronutrient component comprising at least 0.2% by weight of iron calculated as elemental iron, wherein the proportion of elemental iron in said second functional feed supplement is at the most 90% of that of the first functional feed supplement,
   the method supplying to the piglet at least the physiologically required amount of iron and other micronutrients during the suckling period.

2. A method according to claim 1 wherein the first functional feed supplement composition is administered from day 1 to about day 10–12.

3. A method according to claim 2 wherein the first functional feed supplement composition is administered in a total amount of about 15–25 g per piglet during said period.

4. A method according to claim 2 wherein the first functional feed supplement is administered as the only feed supplement.

5. A method according to claim 1 wherein the second functional feed supplement composition is administered from about day 10–12 and at least until weaning.

6. A method according to claim 5 wherein the second functional feed supplement is administered until at least 2 days after weaning.

7. A method according to claim 5 wherein the second functional feed supplement composition is administered in an average amount of at least about 5 g per day per piglet.

8. A method according to claim 6 wherein the second functional feed supplement composition is administered in a total amount of about 40–80 g per piglet from weaning to about 2 days after weaning.

9. A method according to claim 5 wherein the piglet is offered, in addition to the second functional feed supplement, a conventional piglet feed composition.

10. A method according to claim 1 wherein the content of elemental iron in the first functional feed supplement composition is at least 2 times higher than that of the second functional feed supplement composition.

11. A method according to claim 1 wherein the dietary fibres are water soluble, fermentable carbohydrates which confer viscosity to an aqueous medium.

12. A method according to claim 1 wherein at least one of said first and second functional feed supplement compositions comprises at least 10% by weight of fermentable dietary fibres.

13. A method according to claim 1 wherein at least one of said first and second functional feed supplement composition further comprise dietary fibres which are water insoluble, non-fermentable carbohydrates.

14. A method according to claim 1 wherein at least one of said first and second functional feed supplement compositions further comprises at least one non-iron element selected from the group consisting of zinc, copper, cobalt and manganese.

15. A method according to claim 14 wherein at least one of the non-iron elements is bound to dietary fibres.

16. A method according to claim 1 wherein at least one of the feed supplement compositions is in the form of agglomerated particles.

17. A method according to claim 1 wherein at least one of said first and second functional feed supplement composition further comprises 5–30% by weight of crude protein.

18. A method according to claim 17 wherein the crude protein is derived from a source selected from the group consisting of a milk product, an at least partially hydrolysed fish product, an at least partially hydrolysed animal product, an at least partially hydrolysed vegetable product, an at least partially hydrolysed microbial product and a mixture thereof.

19. A method according to claim 1 wherein at least one of said first and second functional feed supplement composition further comprises a lipid component.

20. A method according to claim 19 wherein the amount of lipid component is in the range of 5–30% by weight.

21. A method according to claim 19 wherein at least part of the lipid component is in an emulsified and homogenised form.

22. A method according to claim 1 wherein at least one of said first and second functional feed supplement compositions further comprises a flavouring agent.

23. A method according to claim 22 wherein the first and second functional feed supplement composition comprises the same flavouring agent.

24. A method according to claim 22 wherein the flavouring agent is selected from the group consisting of a hydrolysed fish product and an ethereal oil.

25. A method according to claim 1 wherein at least one of said first and second functional feed supplement compositions further comprises an organic acid or a salt thereof.

26. A method according to claim 1 wherein at least one of said functional feed supplement compositions further comprises one or more bacterial or yeast cultures having a growth promoting effect and/or a disease-preventing effect.

27. A method according to claim 1 wherein the iron is in the form of an organic iron compound.

28. A method according to claim 27 wherein the organic iron compound is selected from the group consisting of iron formate, iron acetate, iron propionate, iron succinate, iron fumarate, iron lactate, iron citrate, an iron-containing amino acid-containing compound, a hexose-containing compound, iron bound to dietary fibres and a mixture of any of such compounds.

29. A method according to claim 27 wherein the organic iron compound is iron fumarate in the form of particles having an average size of at the most 30 μm.

30. A method according to claim 1 comprising the further step of administering to the piglet after weaning a third functional feed supplement composition comprising dietary fibres and electrolytes.

31. A method according to claim 30 wherein the third functional feed supplement composition comprises at least 30% by weight of dietary fibres.

32. A method according to claim 30 wherein the dietary fibres are water soluble, fermentable carbohydrates which confer viscosity to an aqueous medium, and water insoluble, non-fermentable carbohydrates.

33. A method according to claim 30 wherein the third functional feed supplement composition further comprises an astringent agent.

34. A method according to claim 33 wherein the astringent agent is a tannin compound.

35. A method according to claim 34 wherein the astringent agent is encapsulated.

36. A method according to claim 30 wherein the third functional feed supplement composition further comprises a flavouring agent.

37. A method according to claim 36 wherein the flavouring agent is selected from the group consisting of a hydrolysed fish product and an ethereal oil.

38. A method according to claim 36 wherein the flavouring agent is the same as that of the first and second functional feed supplement composition.

39. A method according to claim 30 wherein the third functional feed supplement composition comprises a further component selected from the group consisting of an organic acid, a salt thereof and a probiotic component.

40. A method according to claim 1 wherein at least one of said functional feed supplement compositions has a water content of at the most 10% by weight.

* * * * *